(12) United States Patent
Katakura et al.

(10) Patent No.: US 8,862,724 B2
(45) Date of Patent: Oct. 14, 2014

(54) PROCESSING APPARATUS, PROCESSING METHOD, AND COMMUNICATION SYSTEM

(75) Inventors: Yukio Katakura, Kawasaki (JP); Hiroaki Komine, Kawasaki (JP); Yasuo Maeda, Kawasaki (JP); Katsuyoshi Tsuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 13/190,167

(22) Filed: Jul. 25, 2011

(65) Prior Publication Data

US 2012/0030350 A1 Feb. 2, 2012

(30) Foreign Application Priority Data

Jul. 30, 2010 (JP) .................................. 2010-171401

(51) Int. Cl.
*G06F 15/173* (2006.01)
*H04L 29/12* (2006.01)

(52) U.S. Cl.
CPC .......... *H04L 61/3085* (2013.01); *H04L 61/106* (2013.01); *H04L 61/1511* (2013.01)
USPC ........... 709/224; 709/225; 709/217; 709/232; 379/112.04; 370/352; 370/401

(58) Field of Classification Search
USPC .......... 709/217, 224–225, 232; 370/352, 401; 379/112.04
See application file for complete search history.

(56) References Cited

U.S. PATENT DOCUMENTS

| | | | |
|---|---|---|---|
| 2006/0190603 A1* | 8/2006 | Anzai et al. .................. | 709/226 |
| 2007/0153776 A1* | 7/2007 | Joseph et al. ................ | 370/356 |
| 2009/0190578 A1* | 7/2009 | Soo et al. ..................... | 370/352 |
| 2011/0271005 A1* | 11/2011 | Bharrat et al. ............... | 709/232 |
| 2011/0293080 A1* | 12/2011 | Katakura et al. ........... | 379/93.02 |
| 2012/0143982 A1* | 6/2012 | Oster et al. .................. | 709/217 |

FOREIGN PATENT DOCUMENTS

| | | |
|---|---|---|
| JP | 60-219851 A | 11/1985 |
| JP | 7-58766 A | 3/1995 |
| JP | 2000-112908 A | 4/2000 |

* cited by examiner

*Primary Examiner* — Yves Dalencourt
*Assistant Examiner* — Kidest Mendaye
(74) *Attorney, Agent, or Firm* — Fujitsu Patent Center

(57) ABSTRACT

A processing apparatus includes: an address converter configured to return an address in response to a search request from a server; and a substitute controller configured to control the address converter to return a first address in response to a first search request from a first server when the address converter has not received a second search request for a second address from a second server, and return the second address in response to the first search request from the first server when the address converter has received a second search request for the second address from the second server.

10 Claims, 11 Drawing Sheets

FIG. 3A

| URI | SIP-IP | NUMBER OF SEARCHES | NUMBER OF SUBSTITUTES (Yb) | NUMBER OF IVR QUERIES (Yb) |
|---|---|---|---|---|
| 012...@...jp | 1.2.3.4/10.20.30.40 | V1 | Yb_1 | Xb_1 |
| 023...@...jp | 2.3.4.5/20.30.40.50 | V2 | Yb_2 | Xb_2 |
| ... | ... | ... | ... | ... |

| TELEPHONE NUMBER | NUMBER OF LINES | CONTRACTED NUMBER OF LINES |
|---|---|---|
| 012... | m1 | n1 |
| 023... | m2 | n2 |

| DESTINATION TELEPHONE NUMBER | TELEPHONE NUMBER OF SUBSTITUTE IVR | NUMBER OF QUERIES ABOUT DESTINATION TELEPHONE NUMBER | | NUMBER OF QUERIES ABOUT TELEPHONE NUMBER OF SUBSTITUTE IVR | NUMBER OF REQUESTS DIRECTLY SENT TO SUBSTITUTE IVR |
|---|---|---|---|---|---|
| | | PREVIOUS CYCLE | CURRENT CYCLE | CURRENT CYCLE | CURRENT CYCLE |
| Na_1 | Nb_1 | Wa_1 | Wb_1 | Xb_1 | Yb_1 |
| Na_2 | Nb_2 | Wa_2 | Wb_2 | Xb_2 | Yb_2 |
| Na_3 | Nb_3 | Wa_3 | Wb_3 | Xb_3 | Yb_3 |
| Na_4 | Nb_4 | Wa_4 | Wb_4 | Xb_4 | Yb_4 |
| Na_5 | Nb_5 | Wa_5 | Wb_5 | Xb_5 | Yb_5 |
| Na_6 | Nb_6 | Wa_6 | Wb_6 | Xb_6 | Yb_5 |
| .... | .... | .... | .... | .... | .... |
| Na_n | Nb_n | Xb_n | Xb_n | Xb_n | Yb_n |

340

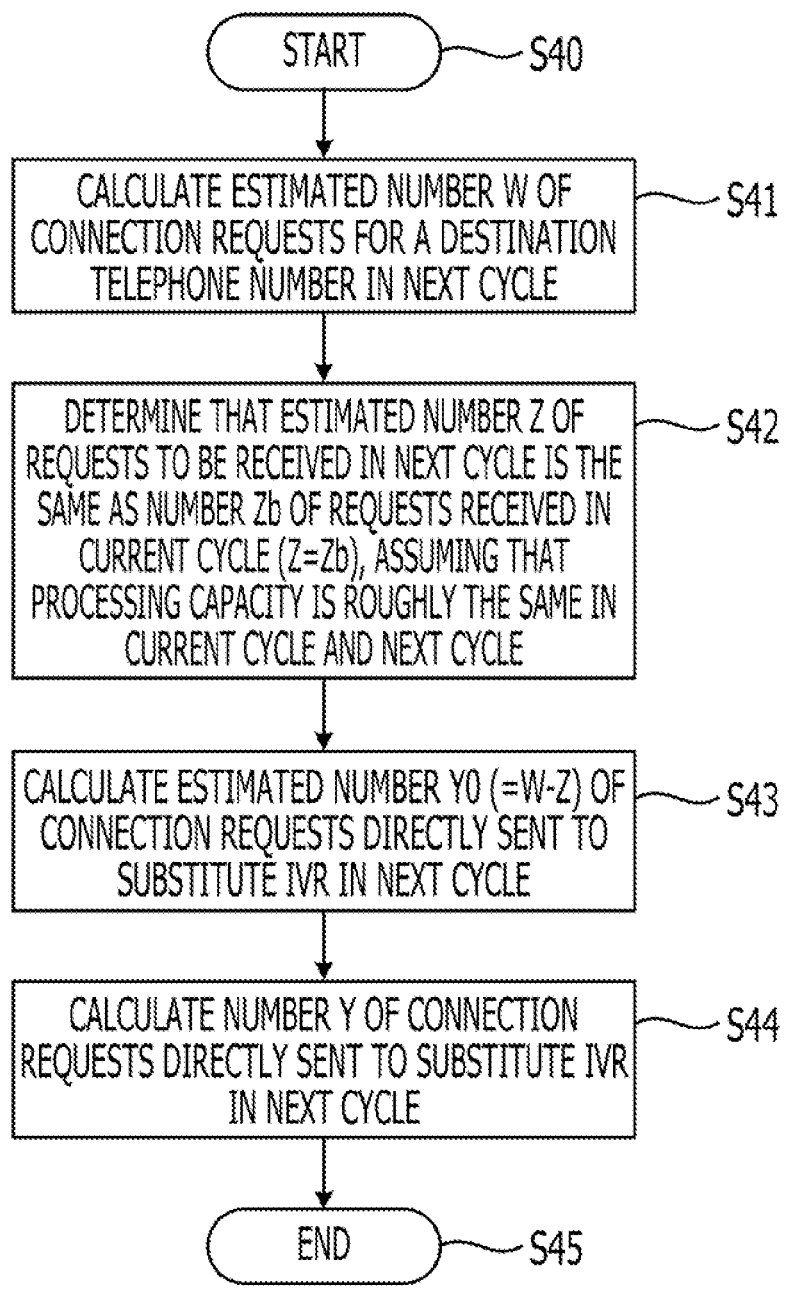

PROCESSING APPARATUS, PROCESSING METHOD, AND COMMUNICATION SYSTEM

CROSS-REFERENCE TO RELATED APPLICATIONS

This application is based upon and claims the benefit of priority from the prior Japanese Patent Application No. 2010-171401 filed on Jul. 30, 2010, the entire contents of which are incorporated herein by reference.

FIELD

The embodiments discussed herein are related to a processing apparatus, a processing method, and a communication system.

BACKGROUND

Communication systems using an Internet Protocol (IP) network, etc. are known. In such a communication system, users access a server to receive various types of services, such as communication services, e.g., Voice over Internet Protocol (VoIP), and website browsing services.

In such a communication system, if communications with or accesses to a server are concentrated at one particular time, network congestion may occur. Due to such network congestion, it may take a longer time to return responses from the server, which may impair stable provision of services, such as communication services and website browsing services.

In this case, network congestion may be avoided by, for example, distributing a processing load over a plurality of pieces of hardware (servers) in advance. With the distribution of the processing load, the concentration of processing on one server occurs less frequently, thereby making it possible to stably provide services.

A technique for distributing a processing load over a plurality of servers is, for example, as follows. When a user uses a Domain Name System (DNS) server by specifying a proxy server, the DNS server may allocate, from a group of servers which are set in a load distribution environment, a server which is operating with a smallest amount of load. An example of the related art is disclosed in Japanese Laid-Open Patent Publication No. 2000-112908.

SUMMARY

According to an aspect of the invention, a processing apparatus including: an address converter configured to return an address in response to a search request from a server; and a substitute controller configured to control the address converter to return a first address in response to a first search request from a first server when the address converter has not received a second search request for a second address from a second server, and return the second address in response to the first search request from the first server when the address converter has received a second search request for the second address from the second server The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 3A and 3B illustrate an example of a URI conversion table and an example of a connection state table, respectively.

FIG. 9 illustrates an example of a management table.

FIG. 10 is a flowchart illustrating an example of calculation processing.

DESCRIPTION OF THE EMBODIMENTS

As an example of the related art, a technique for allocating, from a group of servers which are set in a load distribution environment, a server which is operating with a smallest amount of load to a user is available. In this technique, however, the user may not be able to connect to a server to which the user wishes to connect. For example, the server allocated to the user may provide services which are different from services that the user wishes to receive. In this case, the user is not able to receive desired services.

On the other hand, if the user is connected to another server, i.e., a server other than the server which is operating with a smallest amount of load, a large amount of load may be imposed on the server which is connected to the user, which may cause the occurrence of congestion.

A case where access is concentrated on a certain telephone number will now be considered.

It will now be assumed that when terminals having this telephone number are all busy, a Session Initiation Protocol (SIP) server handling this telephone number transfers access (calls) that are subsequently received to an automatic response device. In other words, the SIP server causes the automatic response device to substitute for the terminals that are busy.

In this case, access may be concentrated on the SIP server to such a degree that it exceeds the processing capacity of the SIP server.

The present embodiments will be described below with reference to the drawings.

Example of Overall Configuration

Figure 1:
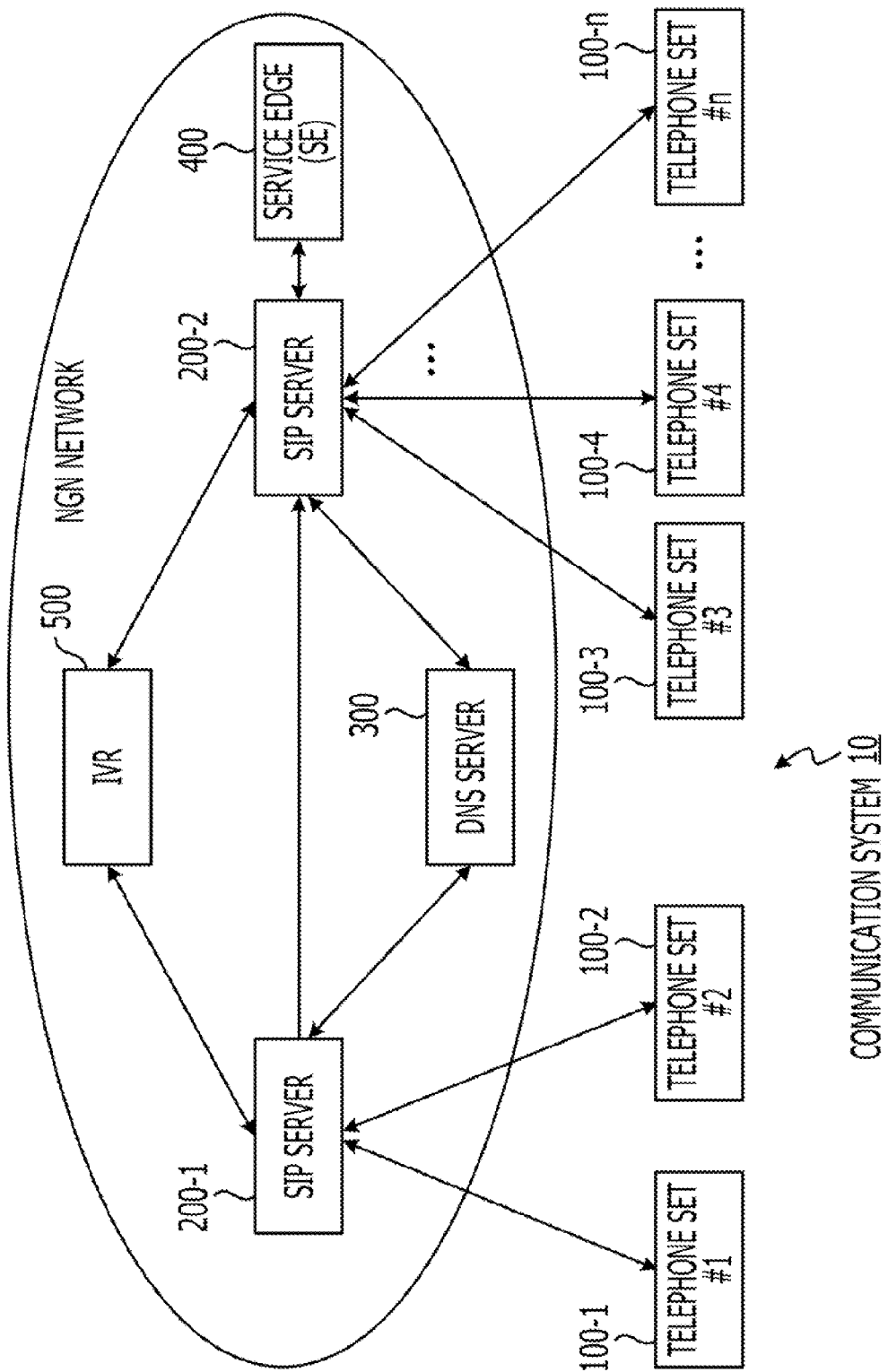
FIG. 1 illustrates an example of the configuration of a communication system.

FIG. 1 is a diagram illustrating an example of the configuration of a communication system 10. In this communication system 10, a telephone set 100-1 or 100-2 sends a connection request (or a communication request) addressed to a certain telephone number of, for example, a main switchboard. Then, the telephone set 100-1 or 100-2 that has called this telephone number is connected to one of telephone sets 100-3 through 100-n (n is an integer of four or greater). Then, the telephone set 100-1 or 100-2 and one of the telephone sets 100-3 through 100-n are ready to communicate with each other.

On the other hand, if telephone calls are concentrated on the telephone sets 100-3 through 100-n, for example, if all the telephone sets 100-3 through 100-n are busy, the telephone set 100-1 or 100-2 is not able to connect to any of the telephone sets 100-3 through 100-n. In this case, the telephone set 100-1 or 100-2 that has called the telephone number of the main switchboard is connected to Interactive Voice Response equipment (IVR) 500 so as to receive voice response services from the IVR 500. The connection path to the IVR 500 will be described later.

An example of the overall configuration of the communication system 10 will be first described below. The communication system 10 includes the telephone sets 100-1 through 100-n, Session Initiation Protocol (SIP) servers 200-1 and 200-2, a Domain Name System (DNS) server 300, a service edge (SE) 400, and the IVR 500.

The telephone sets 100-1 through 100-n are, for example, terminal devices that receive various services, and may be fixed telephones used in wired communication or cellular telephones used in wireless communication. The telephone set 100-1 or 100-2 is configured to send a SIP code (or a message) which includes a Uniform Resource Identifier (URI) and the telephone number of a receiver to the SIP server 200-1. In this embodiment, as the telephone number of a receiver, the telephone number of a main switchboard will be discussed by way of example.

The URI is in the form of a description format indicating the location of an information resource within a network. If the telephone number of the main switchboard is "01-2345-6789", the URI may be expressed as "0123456789@***.jp". The URI includes information concerning the telephone number. For example, the telephone sets 100-1 and 100-2, which are senders, store therein the URI of the telephone number of the main switchboard, which is the receiver, so as to send a SIP code including the telephone number of the main switchboard.

The SIP servers 200-1 and 200-2 are servers that perform, by using, for example, a SIP protocol, call control for calling one of the telephone sets 100-3 through 100-n or the IVR 500 so as to connect to the called telephone set. Upon receiving a SIP code from the telephone set 100-1 or 100-2, the SIP server 200-1 sends a search request using the URI included in the SIP code as a key to the DNS server 300. Upon obtaining an IP address from the DNS server 300, the SIP server 200-1 or 200-2 sends a SIP code which is addressed to the obtained IP address to the telephone set indicated by the IP address.

The DNS server 300 is a processor that converts a URI to be searched for into an IP address. The DNS server 300 receives a search request from the SIP server 200-1 or 200-2 and reads the IP address corresponding to the URI from a URI conversion table. The DNS server 300 then returns the read IP address to the SIP server 200-1 or 200-2. Details of the DNS server 300 will be discussed later.

The service edge 400 is connected to the SIP server 200-2 and manages the connection state of the lines. When, for example, all the telephone sets 100-3 through 100-n are connected and busy, the service edge 400 determines that none of the telephone sets 100-3 through 100-n can be connected to, and outputs a busy response. Details of the service edge 400 will be discussed later.

The IVR 500 is a device that provides voice response services. In response to a request from the SIP server 200-1 or 200-2, the IVR 500 automatically sends, for example, speech or characters stored in the IVR 500. The SIP servers 200-1 and 200-2, the DNS server 300, the service edge 400, the IVR 500 form a Next Generation Network (NGN).

Figure 2:
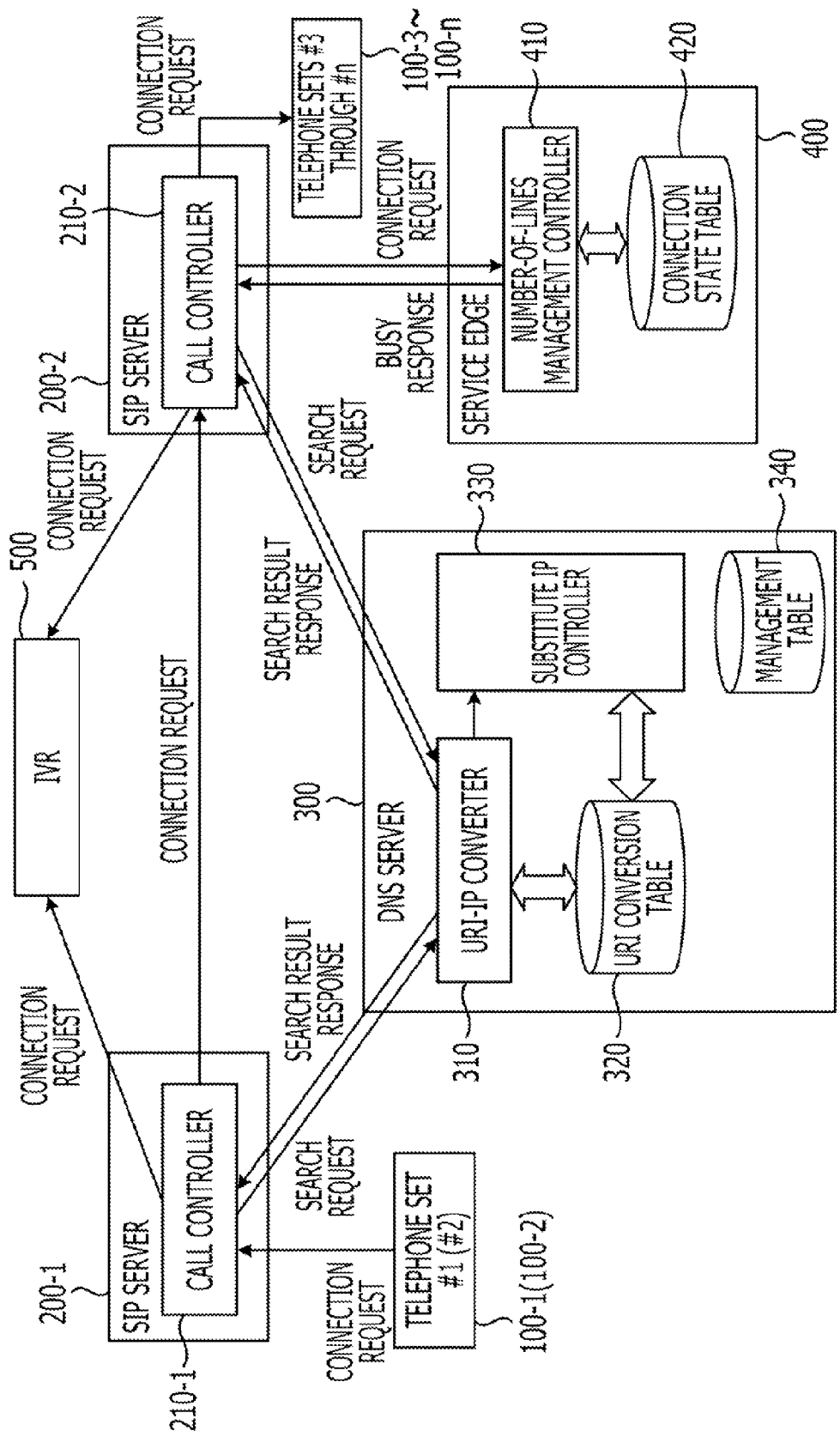
FIG. 2 illustrates an example of the configuration of each of SIP servers, a DNS server, and a service edge.

FIG. 2 illustrates an example of the configuration of each of the SIP servers 200-1 and 200-2, the DNS server 300, and the service edge 400.

The SIP server 200-1 includes a call controller 210-1. The call controller 210-1 performs the above-described call control. The call controller 210-1 receives, for example, a SIP code (e.g., an INVITE message) representing a connection request (or a communication request) from the telephone set 100-1 or 100-2. Then, the call controller 210-1 extracts a URI of the receiver (e.g., the telephone number of the main switchboard of one of the telephone units 100-3 through 100-n) included in the SIP code. The call controller 210-1 then sends a search request including the extracted URI to the DNS server 300, and obtains an IP address corresponding to the URI from the DNS server 300. Then, the call controller 210-1 sends a SIP code which is addressed to the obtained IP address (SIP server 200-2 or IVR 500). Hereinafter, a SIP code and a connection request are treated as being the same unless otherwise stated.

The DNS server 300 includes a URI-IP converter 310, a URI conversion table 320, a substitute IP controller 330, and a management table 340.

The URI-IP converter 310 may also be called an address converter.

The substitute IP controller 330 may also be called a substitute controller.

The DNS server 300 may include an interface circuit that communicates with other servers.

The DNS server 300 may include a memory that stores a program which has functions as the address converter and the substitute controller, a central processing unit (CPU) that executes the program, and a memory that stores various tables.

The functions of the address converter and the substitute controller may be implemented as hardware, such as a field-programmable gate array (FPGA) or an application specific integrated circuit (ASIC).

In response to a search request from the call controller 210-1 or a call controller 210-2, the URI-IP converter 310 searches the URI conversion table 320 for an IP address corresponding to the URI included in the search request. The URI-IP converter 310 sends the obtained IP address to the call controller 210-1 or 210-2. In the example illustrated in FIG. 2, in response to a search request from the call controller 210-1, the URI-IP converter 310 returns the IP address of the IVR 500 or the SIP server 200-2 (or the ID number for identifying the IVR 500 or the SIP server 200-2), which is the receiver.

Also, in response to a search request to obtain the IP address of the IVR 500 from the call controller 210-2, the URI-IP converter 310 sends the IP address of the IVR 500. It should be noted that when receiving a search request from the call controller 210-1 or 210-2 or when sending the IP address of the IVR 500 to the call controller 210-1, the URI-IP converter 310 sends a signal indicating that a search request has been received or that the IP address of the IVR 500 has been sent to the substitute IP controller 330.

The URI conversion table 320 stores IP addresses corresponding to URIs.

FIG. 3A illustrates an example of the URI conversion table 320. In the example illustrated in FIG. 3A, "SIP-IP" indicates the IP addresses corresponding to the URIs. The URI conversion table 320 also includes fields, such as the "number of searches", the "number of substitutes", and the "number of IVR queries" for each URI.

The "number of searches" indicates the number of search requests concerning a certain URI received by the URI-IP converter 310 from the call controllers 210-1 and 210-2. For example, upon receiving a search request from the call controller 210-1 or 210-2, the URI-IP converter 310 stores the number of searches by sequentially counting up the number of searches corresponding to the URI in the "number of searches" field in the conversion table 320.

The "number of substitutes" indicates the number of responses returned in the form of the IP address of the IVR 500 by the URI-IP converter 310 in response to search requests from the call controller 210-1. The "number of substitutes" is calculated by the substitute IP controller 330 and is stored in the URI conversion table 320. Details of the "number of substitutes" will be discussed later. If the "number of searches" is less than the "number of substitutes", the URI-IP converter 310 returns the IP address of the IVR 500 in response to a search request from the SIP server 200-1. If the "number of searches" exceeds the "number of substitutes", the URI-IP converter 310 returns the IP address of the SIP server 200-2. Accordingly, the URI conversion table 320 stores the two IP addresses of the IVR 500 and the SIP server 200-2 for one URI.

The "number of IVR queries" indicates the number of search requests for the IP address of the IVR 500 received from the call controller 210-2. If there is even one IVR query request stored in the "number of IVR queries", it means that all the telephone sets 100-3 through 100-n are busy. Instead of the "number of IVR queries", the "IVR query flag" may be set, and upon receiving a search request for the IP address of the IVR 500, the URI-IP converter 310 may turn ON the "IVR query flag".

The substitute IP controller 330 calculates the number of substitutes in the next cycle on the basis of the number of connection requests from the call controllers 210-1 and 210-2. The substitute IP controller 330 stores the calculated number of substitutes in the "number of substitutes" field of the URI conversion table 320. Calculation processing for the number of substitutes will be discussed later.

The management table 340 is a table used when the substitute IP controller 330 performs calculation processing for the number of substitutes. Upon receiving a signal representing a connection request from the URI-IP converter 310, the substitute IP controller 330 counts the number of connection requests and stores it in the management table 340. Details of the management table 340 will be discussed later.

The SIP server 200-2, as well as the SIP server 200-1, includes the call controller 210-2. Upon receiving a busy response from the service edge 400, the call controller 210-2 determines that all the telephone sets 100-3 through 100-n are busy, and sends a search request to obtain the IP address of the IVR 500 to the DNS server 300. Upon receiving the IP address of the IVR 500 from the DNS server 300, the call controller 210-2 sends a search request received from the SIP server 200-1 to the IVR 500. In contrast, upon receiving a connection response from the service edge 400, the call controller 210-2 sends the connection request received from the SIP server 200-1 to one of the telephone sets 100-3 through 100-n that is available.

The service edge 400 includes a number-of-lines management controller 410 and a connection state table 420. Upon receiving a connection request from the call controller 210-2, the number-of-lines management controller 410 extracts the telephone number of the receiver (e.g., the telephone number of the main switchboard) from the URI included in the connection request, and determines whether the number of lines allocated to this telephone number exceeds the contracted number of lines. The contracted number is stored in the connection state table 420.

FIG. 3B illustrates an example of the connection state table 420. In the connection state table 420, the "number of lines" indicating the current number of connections (lines) and the "contracted number of lines" indicating the maximum number of lines that can be connected are stored for each telephone number. For example, upon receiving a connection request, the number-of-lines management controller 410 increments the "number of lines" by one. When the "number of lines" is less than the "contracted number of lines", it means that it is possible to connect to one of the telephone sets 100-3 through 100-n, and the number-of-lines management controller 410 returns a connection response indicating that it is possible to connect to one of the telephone sets 100-3 through 100-n. In contrast, if the "number of lines" exceeds the "contracted number of lines", it means that all the telephone sets 100-3 through 100-n are busy, and the number-of-lines management controller 410 returns a busy response.

Examples of Operation

Examples of the operation performed by the communication system 10 will now be described below. A description is first given of an example in which the telephone set 100-1 sends a connection request (or a communication request) addressed to the telephone number of the main switchboard to one of the telephone sets 100-3 through 100-n (first operation example). Then, an example in which all the telephone sets are busy, and a connection request is directly sent from the SIP server 200-1 to the IVR 500 will be discussed (second operation example). Finally, an example in which all the telephone sets 100-3 through 100-n are busy, and a connection request from the telephone set 100-1 is sent to the IVR 500 via the SIP server 200-2.

First Operation Example

Figure 4:
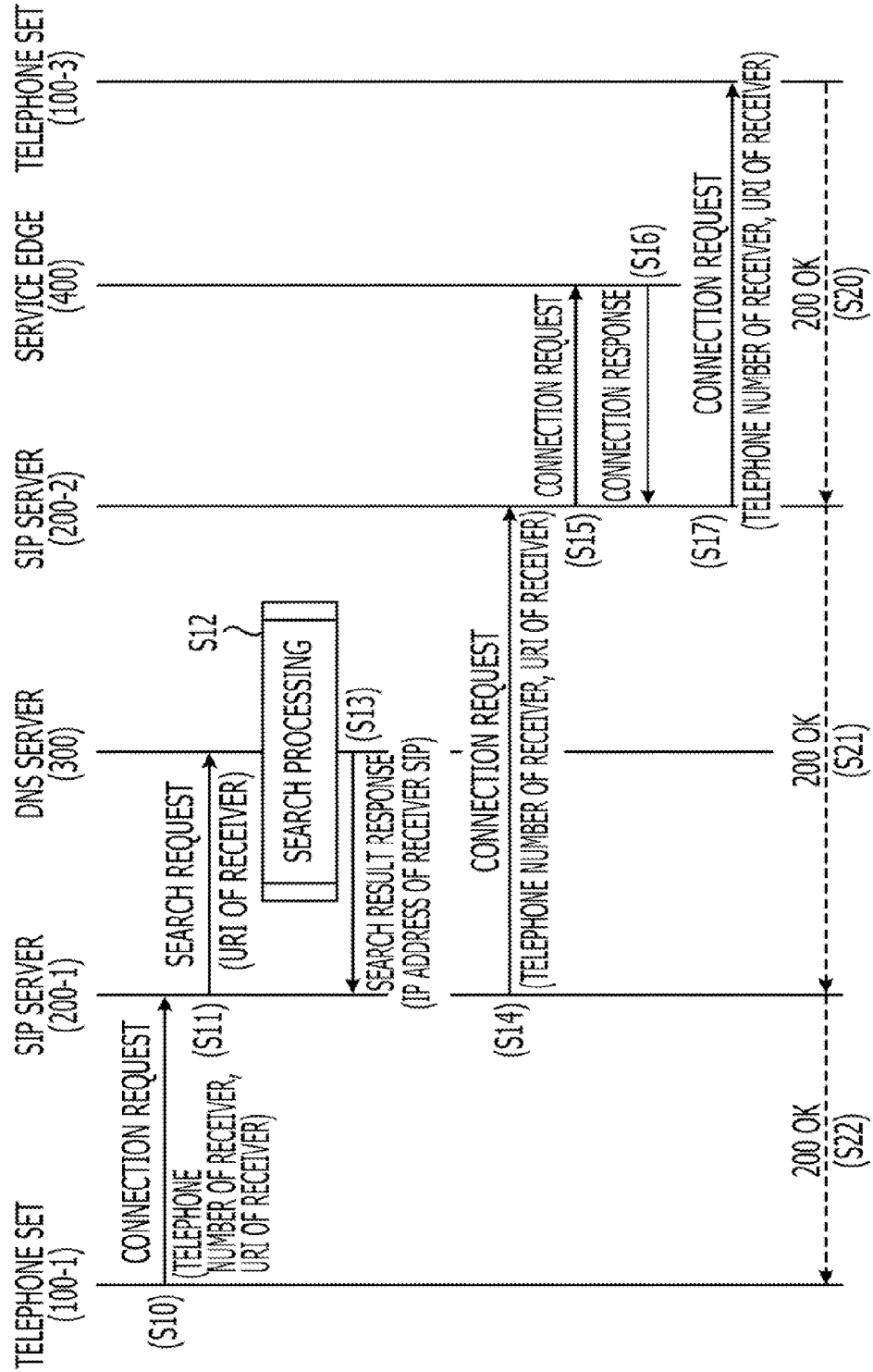
FIG. 4 is a sequence diagram illustrating an example of the overall operation.

FIG. 4 is a sequence diagram illustrating the first operation example in which a connection request from the telephone set 100-1 is sent to one of the telephone sets 100-3 through 100-n.

In operation S10, the telephone set 100-1 sends a SIP code (e.g., an INVITE message) indicating a connection request addressed to one of the telephone sets 100-3 through 100-n, which is the receiver. This connection request includes the telephone number of the main switchboard of the receiver and the URI (in this embodiment, the URI including the telephone number of the main switchboard) of the receiver.

In operation S11, the SIP server 200-1 receives a connection request sent from the telephone set 100-1 and extracts the URI included in the connection request. The SIP server 200-1 then sends a search request to search for the IP address corresponding to the URI to the DNS server 300. For example, the call controller 210-1 sends a search request to the DNS server 300.

Figure 5:
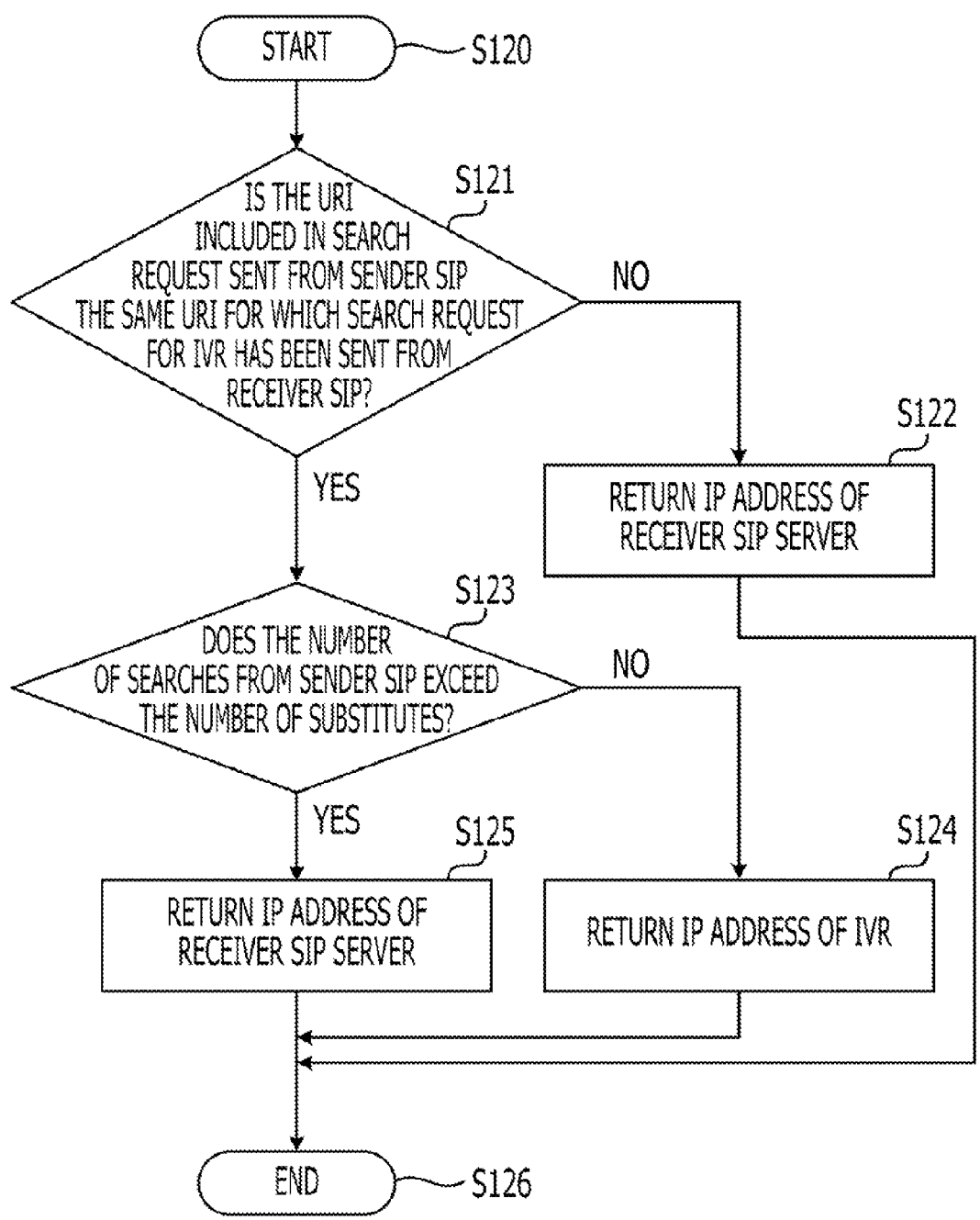
FIG. 5 is a flowchart illustrating an example of search processing.

In operation S12, upon receiving the search request sent from the SIP server 200-1, the DNS server 300 performs search processing. FIG. 5 is a flowchart illustrating an example of the operation of the search processing.

In operation S120, the DNS server 300 starts search processing. The DNS server 300 determines in operation S121 whether the URI included in the search request is the URI for which a search request for the IP address of the IVR 500 has been sent from the SIP server 200-2. If the DNS server 300 receives a search request to search for the IP address of the IVR 500 from the SIP server 200-2, it means that all the telephone sets 100-3 through 100-n are busy. The DNS server 300 determines from the result of operation S121 whether it is possible to send the connection request corresponding to the search request to one of the telephone sets 100-3 through 100-n.

For example, upon receiving a search request from the SIP server 200-1 (sender SIP), the URI-IP converter 310 extracts the URI from the search request. Then, the URI-IP converter 310 searches the URI conversion table 320 to check whether the "number of IVR queries" corresponding to the extracted URI is 0. If the "number of IVR queries" corresponding to the extracted URI is 0, the URI-IP converter 310 determines that a search request concerning the extracted URI has not been received from the SIP server 200-2 (i.e., it is possible to connect to one of the telephone sets 100-3 through 100-n). That is, the result of operation S121 is NO.

In contrast, if the "number of IVR queries" corresponding to the extracted URI is 1 or greater, the URI-IP converter 310 determines that a search request to search for the IP address of the IVR 500 concerning the extracted URI has been received from the SIP server 200-2 (i.e., it is not possible to connect to any of the telephone sets 100-3 through 100-n).

In the example illustrated in FIG. 4, the URI-IP converter 310 determines that the "number of IVR queries" is 0 (it is possible to connect to one of the telephone sets 100-3 through 100-n), (i.e., the result of operation S121 is NO). In operation S13 of FIG. 4 (or S122 of FIG. 5), the URI-IP converter 310 returns the IP address of the SIP server 200-2, which is the receiver, to the SIP server 200-1.

It should be noted that, upon receiving a search request concerning the URI of the receiver from the SIP server 200-1, the URI-IP converter 310 sends a signal indicating that the search request has been received to the substitute IP controller 330.

In operation S14, upon receiving the IP address from the DNS server 300, the SIP server 200-1 sends the connection request received from the telephone set 100-1 or 100-2 to the IP address (the IP address of the SIP server 200-2). In this example, the SIP server 200-1 sends the connection request to the SIP server 200-2. For example, the call controller 210-1 converts the connection request received from the telephone set 100-1 to a connection request to be addressed to the IP address obtained from the DNS server 300, and sends the converted connection request to the SIP server 200-2.

In operation S15, upon receiving the connection request from the SIP server 200-1, the SIP server 200-2 sends a connection request to the service edge 400. For example, the call controller 210-2 transfers the connection request received from the SIP server 200-1 to the service edge 400.

The service edge 400 determines whether it is possible to send the connection request received from the SIP server 200-2 to one of the telephone sets 100-3 through 100-n. For example, the number-of-lines management controller 410 increments the "number of lines" by one in the connection state table 420 corresponding to the telephone number included in the connection request received from the SIP server 200-2, and stores the counted "number of lines" in the connection state table 420. Then, the number-of-lines management controller 410 compares the "number of lines" with the "contracted number of lines" in the connection state table 420. In the example illustrated in FIG. 4, since it is possible to connect to one of the telephone sets 100-3 through 100-n, the "contracted number of lines" is greater than the "number of lines". Accordingly, in operation S16, the number-of-lines management controller 410 returns a connection response indicating that it is possible to connect to one of the telephone sets 100-3 through 100-n to the SIP server 200-2.

In operation S17, upon receiving the connection response from the service edge 400, the SIP server 200-2 determines that it is possible to connect to one of the telephone sets 100-3 through 100-n, and sends a connection request to one of the telephone sets 100-3 through 100-n. For example, the call controller 210-2 sends a connection request to the telephone set 100-3. In the connection state table 420 of the service edge 400, information concerning the telephone sets 100-3 through 100-n that are currently being connected is stored.

When sending a connection response, the number-of-lines management controller 410 extracts information concerning the telephone sets other than those that are currently being connected and sends the information to the SIP server 200-2. By receiving this information, the call controller 210-2 obtains information concerning one of the telephone sets 100-3 through 100-n, for example, the telephone set 100-3, and sends a connection request to the telephone set 100-3.

In operation S20, the telephone set 100-3, for example, that has received the connection request generates a connection response representing a connection permission (a SIP code, e.g., a "200 OK" message) and sends the connection response to the SIP server 200-2. In operation S21, the connection response is sent from the SIP server 200-2 to the SIP server 200-1, and then, in operation S22, the connection response is sent from the SIP server 200-1 to the telephone set 100-1. As a result, the telephone sets 100-1 and 100-3 are ready to communicate with each other.

Second Operation Example

Figure 6:
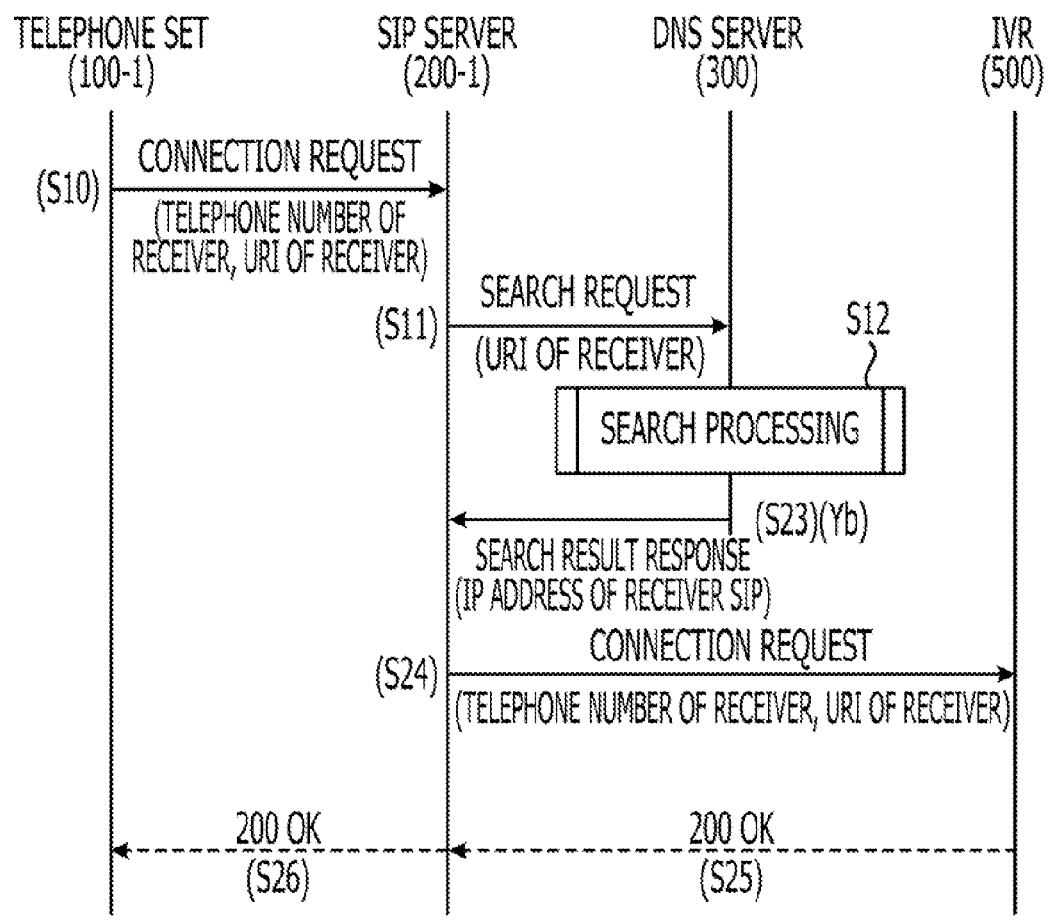
FIG. 6 is a sequence diagram illustrating an example of the overall operation.

A description will now be given of a second example in which the SIP server 200-1 directly sends a connection request from the telephone set 100-1 to the IVR 500 because all the telephone sets 100-3 through 100-n are busy. FIG. 6 is a sequence diagram illustrating the second operation example. In FIG. 6, the same operations as those in FIG. 4 are designated by like operation numbers, and an explanation thereof is thus omitted.

In operation S11, the DNS server 300 receives a search request for the URI including the telephone number of the main switchboard from the SIP server 200-1. In operation S12, the DNS server 300 performs search processing. In the search processing (for example, FIG. 5) in this example, since all the telephone sets 100-3 through 100-n are busy, the "number of IVR queries" corresponding to the URI included in the search request is 1 or greater. That is, the result of operation S121 is YES.

Immediately after all the telephone sets 100-3 through 100-n have become busy, the "number of IVR queries" in the URI conversion table 320 of the DNS server 300 is still 0. In this state, if the telephone set 100-1 or 100-2 sends a connection request to connect to the telephone number of the main switchboard, the DNS server 300 returns the IP address of the SIP server 200-2 since the "number of IVR queries" is 0 (operation S122 of FIG. 5 or operation S14 of FIG. 4). Upon receiving the connection request, the SIP server 200-2 asks the service edge 400 about the connection state and receives a busy response so as to determine that it is not possible to connect to any of the telephone sets 100-3 through 100-n. In this case, the SIP server 200-2 sends a search request to search for the IP address of the IVR 500 as an alternative to the DNS server 300, and the DNS server 300 sets the "number of IVR queries" of the URI conversion table 320 to be 1. Then, the SIP server 200-2 sends a connection request to the IVR 500. With this procedure, the "number of IVR queries" is changed to 1. Thereafter, in response to a search request from the SIP server 200-1, the DNS server 300 returns the IP address of the IVR 500 until the number of search requests reaches the number of substitutes.

Then, in operation S123, the DNS server 300 determines whether the number of searches exceeds the number of substitutes. The URI-IP converter 310 makes this determination by comparing the "number of substitutes" with the "number of searches" stored in the URI conversion table 320. In this example, since the number of search requests concerning the telephone number of the main switchboard does not exceed the number of substitutes (i.e., the result of operation S123 is NO), the URI-IP converter 310 returns the IP address of the IVR 500 (operation S124 or operation S23 of FIG. 6). The DNS server 300 returns the IP address of the IVR 500 until the number of search requests reaches the number of substitutes.

It should be noted that, when returning the IP address of the IVR 500 in operation S23, the URI-IP converter 310 sends a signal indicating that the IP address of the IVR 500 has been sent to the SIP server 200-1 to the substitute IP controller 330.

Upon receiving the IP address of the IVR 500 from the DNS server 300, in operation S24, the SIP server 200-1 directly sends the connection request from the telephone set 100-1 or 100-2 to the IVR 500.

Upon receiving the connection request from the SIP server 200-1, in operation S25, the IVR 500 sends a connection response indicating a connection permission (e.g., a "200 OK" message) to the SIP server 200-1. In operation S26, the connection response is sent from the SIP server 200-1 to the telephone set 100-1 or 100-2. As a result, the telephone set 100-1 or 100-2 is ready to communicate with the IVR 500 so as to receive services, such as automatic voice guidance, from the IVR 500.

As described above, instead of the IP address of the SIP server 200-2, the DNS server 300 reports the IP address of the IVR 500 to the SIP server 200-1. Thus, even if all the telephone sets 100-3 through 100-$n$ are busy or even if congestion occurs between the SIP servers 200-1 and 200-2, a connection request can be directly sent from the SIP server 200-1 to the IVR 500, thereby allowing the telephone set 100-1 or 100-2 to connect to the IVR 500. Additionally, since a connection request is directly sent from the SIP server 200-1 to the IVR 500, the load imposed on the SIP server 200-2 can be decreased.

Third Operation Example

A description will now be given of a third operation example in which a connection request from the telephone set 100-1 is sent from the SIP server 200-1 to the IVR 500 via the SIP server 200-2 since all the telephone sets 100-3 through 100-$n$ are busy.

If all the telephone sets 100-3 through 100-$n$ are busy, all connection requests from the telephone sets 100-1 and 100-2 may be directly sent from the SIP server 200-1 to the IVR 500. However, by sending some connection requests to the IVR 500 via the SIP server 200-2, the occurrence of congestion between the SIP server 200-1 and the IVR 500 can be avoided.

Figure 7:
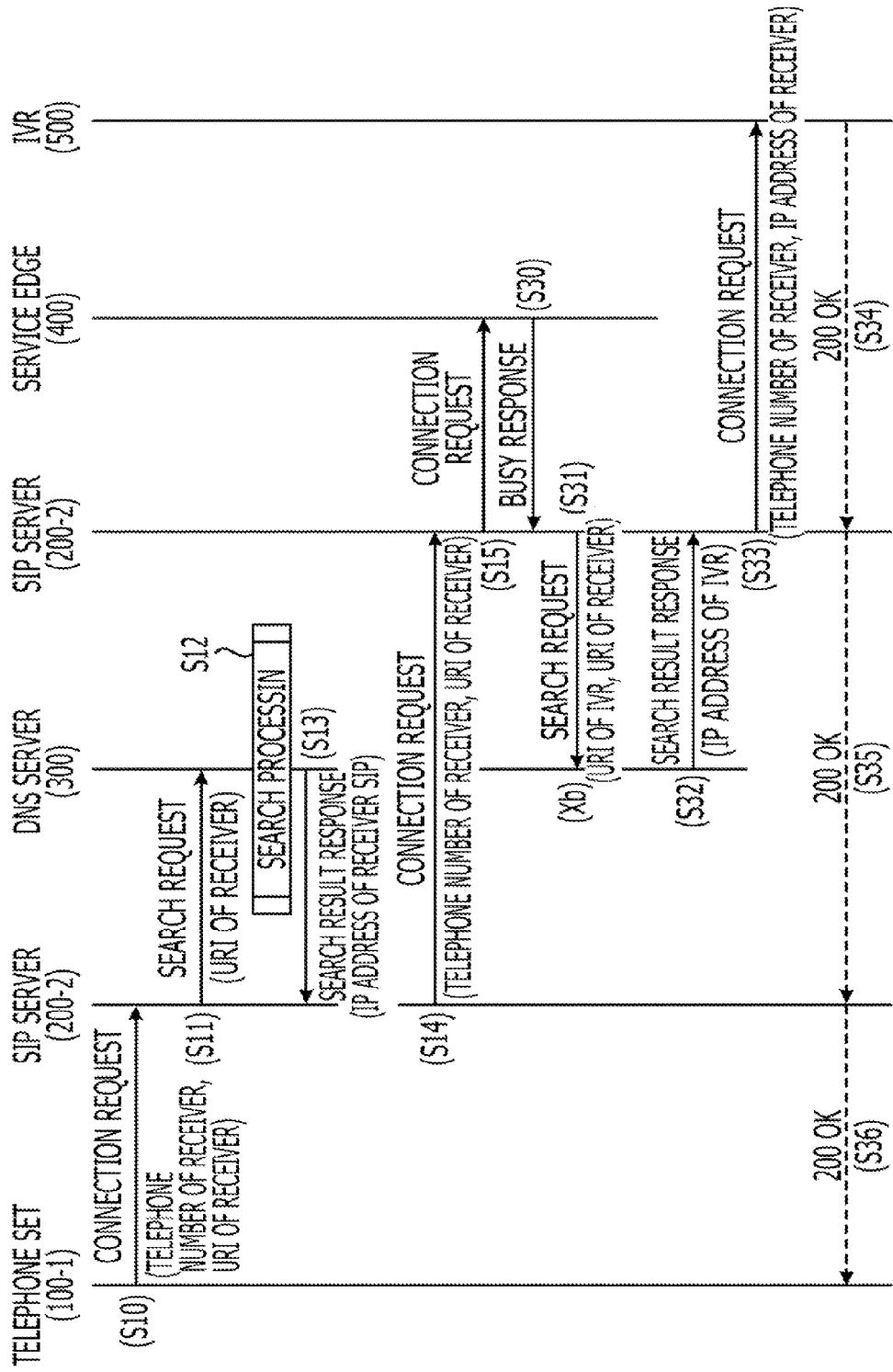
FIG. 7 is a sequence diagram illustrating an example of the overall operation.

FIG. 7 is a sequence diagram illustrating the third operation example. In FIG. 7, the same operations as those in FIG. 4 are designated by like operation numbers, and an explanation thereof is thus omitted.

In operation S11, the DNS server 300 receives a search request concerning the URI including the telephone number of the main switchboard (or one of the telephone sets 100-3 through 100-$n$) from the server 200-1. In operation S12, the DNS server 300 performs search processing. In the search processing (for example, FIG. 5) in this example, since all the telephone sets 100-3 through 100-$n$ are busy (i.e., the result of operation S121 is YES), the number of searches from the SIP server 200-1 exceeds the number of substitutes (i.e., the result of operation S123 is YES).

Then, in operation S125 or operation S13 of FIG. 7, the DNS server 300 returns the IP address of the SIP server 200-2. For example, the URI-IP converter 310 accesses the URI conversion table 320 and determines that the "number of searches" exceeds the "number of substitutes", and also reads the IP address of the SIP server 200-2 so as to return the IP address of the SIP server 200-2 to the SIP server 200-1.

Upon receiving the IP address of the SIP server 200-2 from the DNS server 300, in operation S14, the SIP server 200-1 sends a connection request to the SIP server 200-2.

Then, in operation S15, the SIP server 200-2 sends this connection request to the service edge 400.

Upon receiving the connection request, the service edge 400 determines whether there is any unoccupied line allocated to the telephone number of the main switchboard. For example, upon receiving the connection request, the number-of-lines management controller 410 increments the number of lines by one, and stores the counted number of lines in the connection state table 420. Then, since the "number of lines" exceeds the "contracted number of lines", in operation S30, the number-of-lines management controller 410 returns a busy response to the SIP server 200-2.

Upon receiving the busy response, in operation S31, in order to connect to the IVR 500, the SIP server 200-2 sends a search request to search for the IP address of the IVR 500 to the DNS server 300. When receiving the busy response, the SIP server 200-2 identifies that all the telephone sets 100-3 through 100-$n$, i.e., the receivers of the telephone number of the main switchboard, are busy, and thus sends a search request to search for the IP address of the IVR 500 to the DNS server 300.

Upon receiving the search request to search for the IP address of the IVR 500, in operation S32, the DNS server 300 accesses the URI conversion table 320 so as to obtain the IP address of the IVR 500, and returns the IP address of the IVR 500 to the SIP server 200-2. For example, the URI-IP converter 310 obtains from the URI conversion table 320 the IP address corresponding to the URI of the IVR 500 included in the search request. The URI-IP converter 310 also writes the number of queries into the "number of IVR queries" in the URI conversion table 320 on the basis of the URI of the receiver included in the search request. The URI-IP converter 310 returns the IP address of the IVR 500 to the SIP server 200-2.

It should be noted that, upon receiving a search request to search for the IP address of the IVR 500, the URI-IP converter 310 sends a signal indicating that a search request has been received to the substitute IP controller 330.

Upon receiving the IP address of the IVR 500, in operation S33, the SIP server 200-2 sends a connection request to the IVR 500. For example, upon receiving the IP address of the IVR 500 from the DNS server 300, the call controller 210-2 sends the connection request received from the SIP server 200-1 (operation S14) to the IVR 500.

Upon receiving the connection request from the SIP server 200-2, in operation S34, the IVR 500 sends a connection response indicating a connection permission (e.g., a "200 OK" message") to the SIP server 200-2. In operation S35, the connection response is sent from the SIP server 200-2 to the SIP server 200-1. In operation S36, the connection response is sent from the SIP server 200-1 to the telephone set 100-1. As a result, the telephone set 100-1 is ready to connect to the IVR 500 via the two SIP servers 200-1 and 200-2 so as to receive services, such as automatic voice guidance, from the IVR 500.

Number of Substitutes

The number of substitutes stored in the URI conversion table 320 will be discussed below. The number of substitutes is calculated by the substitute IP controller 330 in a certain cycle. The substitute IP controller 330 stores the calculated number of substitutes in the "number of substitutes" field in the URI conversion table 320. In the next cycle, the substitute IP controller 330 performs the above-described allocation on the basis of the number of substitutes stored in the "number of substitutes" field.

The number of queries and requests used in the calculation processing are described first.

Figure 8A:
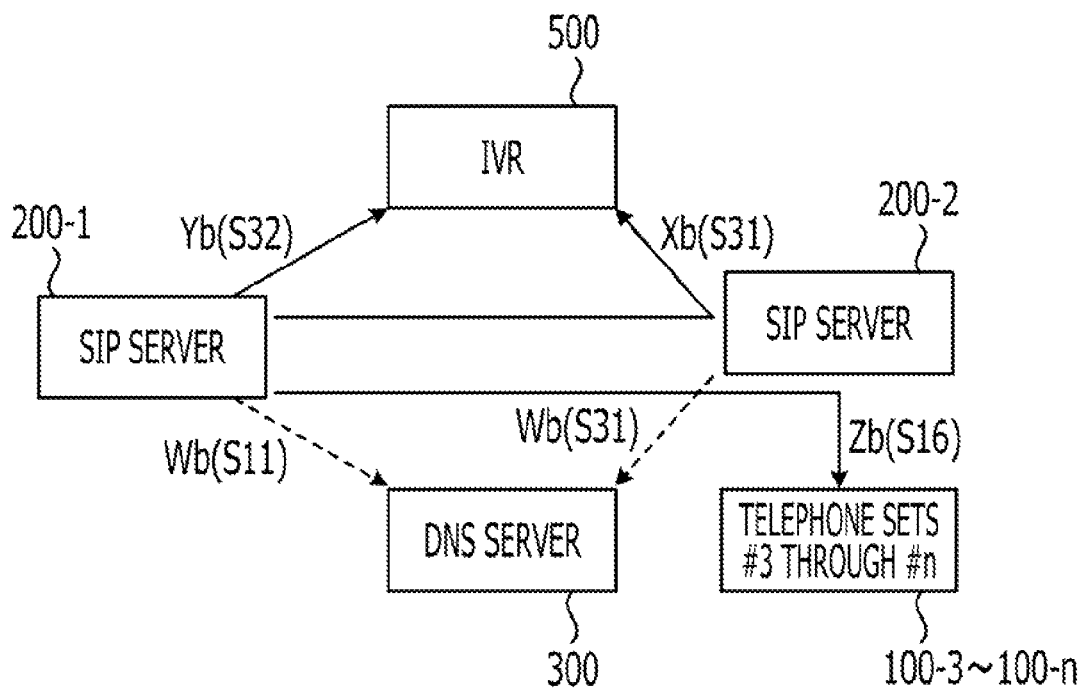
FIGS. 8A and 8B illustrate examples of the numbers of queries and requests in the current cycle and an example of the relationship between the cycles and the numbers of queries and requests, respectively.

FIG. 8A is a block diagram illustrating examples of the numbers of queries and requests in the current cycle.

In the current cycle, the number Wb of queries about destination telephone numbers, the number Xb of queries about the telephone number of the substitute IVR, the number Yb of requests directly sent to the substitute IVR, and the number Zb of requests received for destination telephone numbers.

The number of queries about destination telephone numbers is the sum of the number of search requests received by the DNS server 300 from the SIP server 200-1 (S11 of FIGS. 4, 6, and 7) and the number of search requests to search for the IP address of the IVR 500 received from the SIP server 200-2 (S31 of FIG. 7). The substitute IP controller 330 receives a signal from the URI-IP converter 310 every time processing S11 or S31 is performed, and counts up the number of signals. The substitute IP controller 330 stores the counted value in the management table 340.

FIG. 9 illustrates an example of the management table 340. The substitute IP controller 330 stores the counted value in the corresponding destination telephone number field "Wb_1", "Wb_2", . . . , in the "current cycle" of the "number of queries about destination telephone number".

Referring back to FIG. 8A, the number Xb of queries about the telephone number of the substitute IVR in the current cycle is the number of connection requests to connect to the IVR 500 received by the DNS server 300 from the SIP server 200-2 (S31 of FIG. 7). The number Xb of queries about the telephone number of the substitute IVR is the number of connection requests sent from the telephone numbers 100-1 and 100-2 to the IVR 500 via the two SIP servers 200-1 and 200-2 in the current cycle. In this case, too, the substitute IP controller 330 stores the number Xb of queries about the telephone number of the substitute IVR in the corresponding field "Xb_1", "Xb_2", . . . , of the management table 340 on the basis of the URI and a signal from the URI-IP converter 310 sent in S31.

The number Yb of requests directly sent to the substitute IVR in the current cycle is the number of responses which are returned in the form of the IP address of the IVR 500 from the DNS server 300 in response to a connection request from the SIP server 200-1 (S23 of FIG. 6). In this case, too, the substitute IP controller 330 stores the number Yb in the corresponding field "Yb_1", "Yb_2", . . . , of the management table 340 on the basis of the URI and a signal from the URI-IP converter 310.

The number Zb of requests for destination telephone numbers received in the current cycle is the number of connection requests sent from the telephone sets 100-1 and 100-2 to the telephone sets 100-3 and 100-n in the current cycle. The number Zb can be calculated by the substitute IP controller 330 from the three numbers Wb, Xb, and Yb, as discussed below.

Figure 8B:
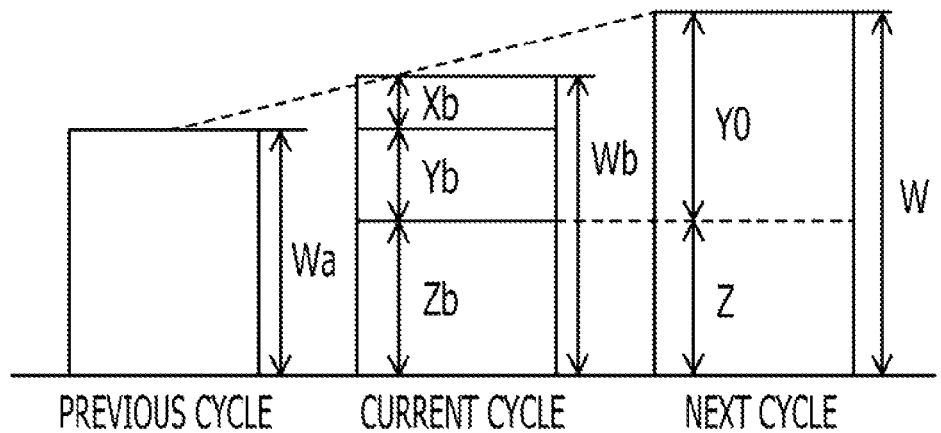

FIG. 8B illustrates the relationship between the above-described numbers and the cycles. There are three cycles, i.e., the previous cycle, the current cycle, and the next cycle. The previous cycle includes the number Wa of queries about destination telephone numbers. The next cycle includes the estimated number Z of requests to be received for destination telephone numbers, the estimated number Y0 of requests directly sent to the substitute IVR, and the estimated number W of connection requests for destination telephone numbers in the next cycle. The number of substitutes is calculated by using those numbers.

The number Wa of queries about destination telephone numbers in the previous cycle is the number of search requests sent to the DNS server 300 in the previous cycle. The number Wb of queries about destination telephone numbers calculated in the current cycle is changed to Wa used in the next cycle. For example, after calculating the number Wb of queries about destination telephone numbers in the current cycle and after the lapse of the cycle period, the substitute IP controller 330 stores the calculated number Wb in the corresponding field "Wa_1", "Wa_2", . . . , of the management table 340 as the number Wa of queries about the destination telephone number used in the next cycle.

The estimated number Z of requests to be received for destination telephone numbers in the next cycle is the estimated number of connection requests to be connected to the telephone sets 100-3 through 100-n. In this embodiment, processing is performed, assuming that Z=Zb, as discussed below.

The estimated number W of connection requests for destination telephone numbers in the next cycle is the total estimated number of search requests sent to the DNS server 300 in the next cycle. The estimated number W can be calculated using calculation processing.

The estimated number Y0 of connection requests directly sent to the substitute IVR is the number of connection requests directly sent to the IVR 500 from the SIP server 200-1 in the next cycle (before adjustment). The estimated number Y0 is calculated using calculation processing.

A description will now be given of calculation processing for the number of substitutes performed by the substitute IP controller 330 using the above-described numbers.

FIG. 10 is a flowchart illustrating an example of calculation processing performed by the substitute IP controller 330. This calculation processing may start upon receiving a search request to search for the IP address of the IVR 500 from the SIP server 200-2 (S31 of FIG. 7) or when a certain time has reached.

Upon start of calculation processing in operation S40, in operation S41, the substitute IP controller 330 calculates the estimated number W of connection requests for a destination telephone number in the next cycle. For example, as illustrated in FIG. 8B, the substitute IP controller 330 calculates the estimated number W of connection requests in the next cycle by utilizing the fact that the two numbers Wa and Wb of connection requests can be linearly represented. The substitute IP controller 330 calculates (or estimates) the estimated number W by using, for example, equation (1):

$$W = Wb + (Wb - Wa) \quad (1).$$

The substitute IP controller 330 calculates the estimated number W of connection requests in the next cycle for each destination telephone number.

By focusing on the number Wb of connection requests in the current cycle, as illustrated in FIG. 8B, the number Wb can be represented by the sum of the number Zb of requests that have connected to the telephone sets 100-3 through 100-n and the number (Xb+Yb) of connection requests that have connected to the IVR 500. That is, the number Wb of connection requests in the current cycle can be expressed by equation (2):

$$Wb = Zb + (Xb + Yb) \quad (2).$$

Referring back to FIG. 10, in operation S42, the substitute IP controller 330 calculates the estimated number Z of requests to be received, assuming that the number Z is equal to the number Zb of requests received in the current cycle. That is, the substitute IP controller 330 performs calculation processing, assuming that:

$$Z=Zb \quad (3).$$

This assumption is based on the presumption that the processing capacity of the DNS server 300 is roughly the same in the current cycle and the next cycle. From equations (3) and (2), equation (4) is obtained;

$$Z=Wb-(Xb+Yb) \quad (4).$$

Then, in operation S43, the substitute IP controller 330 calculates the estimated number Y0 of connection requests directly sent to the substitute IVR 500 in the next cycle according to equation (5).

$$Y0=W-Z \quad (5)$$

As illustrated in FIG. 8B, the estimated number Y0 of connection requests directly sent to the substitute IVR in the next cycle can be calculated as the difference between the estimated number W of connection requests in the next cycle and the estimated number Z of requests to be received for destination telephone numbers.

By substituting equations (1) and (4) into equation (5), equation (5) can be modified into equation (6):

$$Y0 = Wb + (Wb - Wa) - \{Wb - (Xb + Yb)\} \quad (6)$$
$$= Wb - Wa + Xb + Yb.$$

The substitute IP controller 330 calculates equation (6) on the basis of the numbers stored in the management table 340, thereby calculating the estimated number Y0 of connection requests directly sent to the substitute IVR in the next cycle.

In this case, some of the estimated number Y0 of connection requests may be sent to the IVR 500 via the SIP server 200-2, and the estimated number Y0 may be multiplied by an adjustment coefficient $\alpha$ (e.g., $0<\alpha\leq 1$). That is, in operation S44, the substitute IP controller 330 calculates equation (7):

$$Y=Y0\alpha=(Wb-Wa+Xb+Yb)\alpha \quad (7).$$

The substitute IP controller 330 stores the number Y in the URI conversion table 320 as the number of connection requests (or the number of substitutes) directly sent to the IVR 500 from the SIP server 200-1 in the next cycle.

After calculating the number Y, the substitute IP controller 330 shifts the current cycle to the previous cycle and the next cycle to the current cycle. That is, the substitute IP controller 330 performs processing expressed by equations (8) and (9):

$$Wa=Wb \quad (8)$$

$$Yb=Y \quad (9).$$

In operation S45, the substitute IP controller 330 finishes calculation processing. With this operation, when the number of substitute IVR queries has become 1, the DNS server 300 starts sending the IP address of the IVR 500 in response to a connection request from the SIP server 200-1, and continues sending the IP address of the IVR 500 until the number of connection requests reaches the number of substitutes. When the number of connection requests exceeds the number of substitutes, the DNS server 300 sends the IP address of the SIP server 200-2 in response to a connection request.

As described above, in this embodiment, by receiving a search request to search for the IP address of the IVR 500 from the SIP server 200-2, the DNS server 300 can identify that all the telephone sets 100-3 through 100-$n$ are busy. After receiving a search request for the IP address of the IVR 500, upon receiving from the SIP server 200-1 a search request corresponding to a connection request to connect to one of the telephone sets 100-3 through 100-$n$, the DNS server 300 returns the IP address of the IVR 500 in response to up to a certain number of search requests. With this arrangement, even if congestion occurs between the SIP servers 200-1 and 200-2 after all the telephone sets 100-3 through 100-$n$ are busy, a connection request can be sent from the SIP server 200-1 to the IVR 500. Thus, the telephone set 100-1 or 100-2 can connect to the IVR 500 so as to receive services, such as automatic voice guidance from the IVR 500.

Other Embodiments

Figure 11:
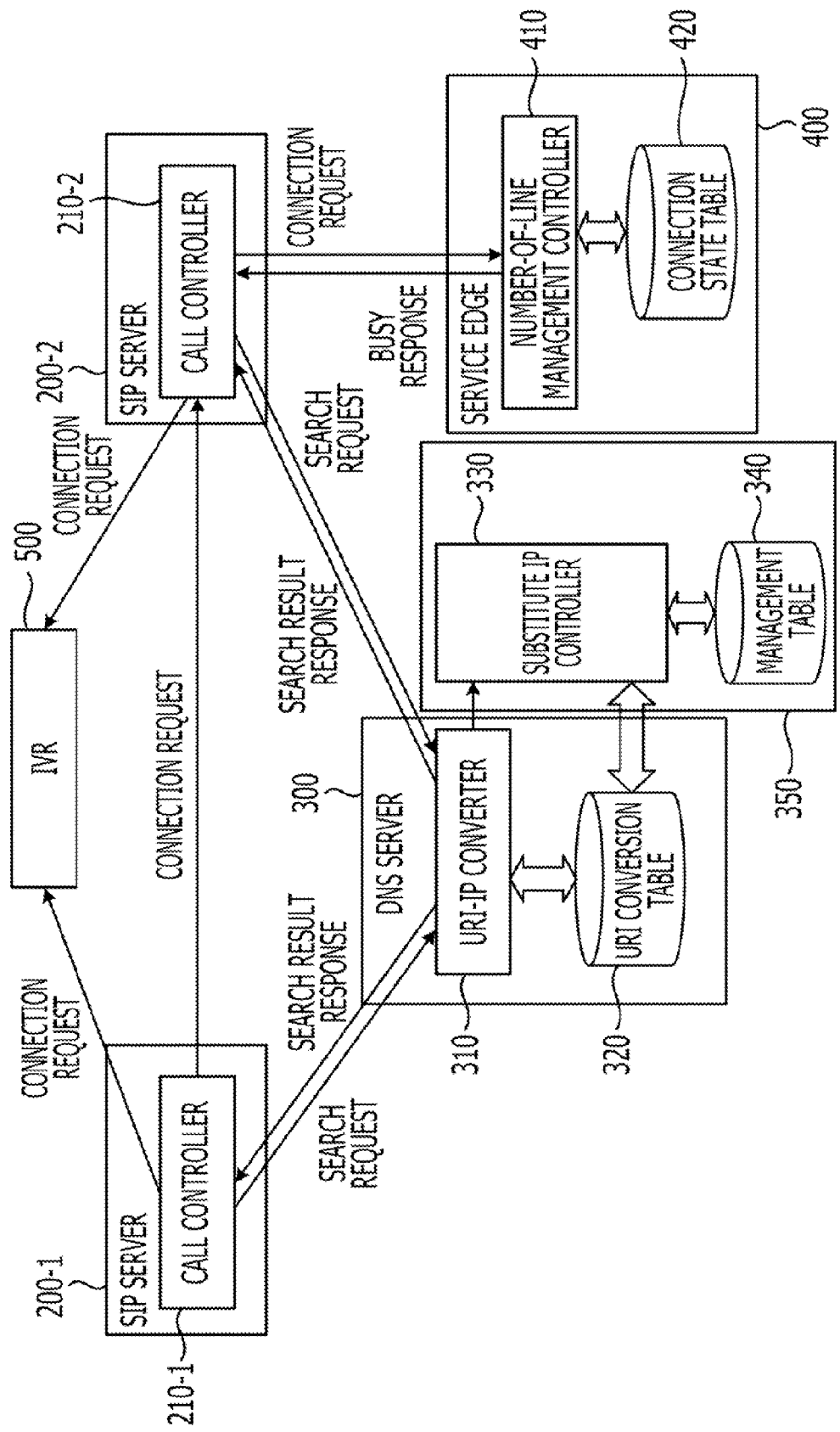
FIG. 11 illustrates an example of the configuration of each of SIP servers, a DNS server, and a service edge, and an external device.

Other embodiments will be described below. In the above-described embodiment, the DNS server 300 includes the URI-IP converter 310, the URI conversion table 320, the substitute IP controller 330, and the management table 340. Alternatively, for example, an external device 350 may be connected to the DNS server 300. FIG. 11 illustrates an example of the configuration of each of the SIP servers 200-1 and 200-2, the DNS server 300, and the service edge 400, and the external device 350. In this case, the external device 350 includes the substitute IP controller 330 and the management table 340. The DNS server 300 includes the URI-IP converter 310 and the URI conversion table 320.

In this case, too, every time the URI-IP converter 310 performs processing S11, S23, or S31, it outputs a signal indicating that the corresponding processing has been performed to the substitute IP controller 330 of the external device 350. The substitute IP controller 330 then performs calculation processing (e.g., FIG. 10) and stores the calculated number of substitutes in the URI conversion table 320. Accordingly, by the use of the external device 350, processing can be performed in a manner similar to the above-described embodiment.

In the above-described embodiment, the number Y of substitutes is calculated by using the number Xb of queries about the telephone number of the substitute IVR and the number Yb of requests directly sent to the substitute IVR in the current cycle (e.g., FIG. 8B). Alternatively, the number Y of substitutes may be calculated by using the number Xa of queries about the telephone number of the substitute IVR and the number Ya of requests directly sent to the substitute IVR in the previous cycle. By determining the number Y of substitutes using quadratic approximation including the numbers in the previous cycle, the precision for allocating the number of requests to the IVR 500 can be improved compared to the above-described embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing apparatus comprising:
   a memory; and a processor coupled to the memory and configured to execute a process, the process includes returning, to a first server, a first address in response to a first search request from the first server when a second search request for a second address from a second server has not been received, and returning, to the first server, the second address in response to the first search request from the first server when the second search request for the second address from the second server has been received, wherein, on the basis of the number of first and second search requests and the number of responses returned in the form of the second address in response to the first search request in a first period and the number of first search requests in a second period, the process includes calculating the number of responses to be returned in the form of the second address in response to the first search request in a third period, and the returning of the second address returns the second address in response to the first search request in the third period for the calculated number of responses.

2. The processing apparatus according to claim 1, further comprising:

a management table configured to store therein the number of first and second search requests and the number of responses returned in the form of the second address in response to the first search request in the first period and the number of first search requests in the second period, wherein the process includes counting the number of first and second search requests and the number of responses returned in the form of the second address in response to the first search request in the first period and the number of first search requests in the second period, stores the counted numbers in the management table, and the calculating calculates the number of responses to be returned in the form of the second address in response to the first search request in the third period on the basis of the counted numbers stored in the management table.

3. The processing apparatus according to claim 1, wherein the process further includes estimating the number of first search requests in the third period on the basis of the number of first search requests in the first period and the number of first search requests in the second period, calculating, on the basis of the number of first and second search requests and the number of responses returned in the form of the second address in response to the first search request in the first period, the number of connection requests to connect to a telephone number which are sent to a telephone set connected to the second server, and calculating, on the basis of the number of first search requests in the third period and the number of connection requests sent to the telephone set, the estimated number of responses to be returned in the form of the second address in response to the first search request in the third period, the calculating calculates, on the basis of the calculated estimated number of responses, the number of responses to be returned in the form of the second address in response to the first search request in the third period.

4. The processing apparatus according to claim 3, wherein the process further includes setting some of the calculated estimated number of responses to be responses to be returned in the form of the second address in response to the first search request in the third period, and setting the remaining responses of the calculated estimated number of responses to be responses to be returned in the form of an address of the second server, the address of the second server being used as the first address.

5. The processing apparatus according to claim 4, wherein the process includes setting the number of responses obtained by multiplying the calculated estimated number by an adjustment coefficient $\alpha$ ($0<\alpha\leq 1$) to be the number of responses to be returned in the form of the second address in response to the first search request in the third period, and setting the remaining calculated estimated number of responses to be responses to be returned in the form of the address of the second server, the address of the second server being used as the first address.

6. The processing apparatus according to claim 1, wherein the first search request includes a telephone number of a telephone set connected to the second server.

7. The processing apparatus according to claim 1, wherein the first address is a number for identifying the second server.

8. The processing apparatus according to claim 1, wherein the second address is a number for identifying an automatic response device connected to the first and second servers.

9. A processing method for use in a processing apparatus that returns an address in response to a search request, the method comprising:

returning, by a processor, a first address to a first server in response to a first search request from the first server when the processing apparatus has not received a second search request for a second address from a second server;

returning, by the processor, the second address to the first server in response to the first search request from the first server when the processing apparatus has received a second search request for the second address from the second server; and on the basis of the number of first and second search requests and the number of responses returned in the form of the second address in response to the first search request in a first period and the number of first search requests in a second period, calculating the number of responses to be returned in the form of the second address in response to the first search request in a third period, wherein the returning of the second address returns the second address in response to the first search request in the third period for the calculated number of responses.

10. A communication system comprising:

a first server connected to a sender telephone set;

a second server connected to a receiver telephone set; and a processing apparatus configured to return, to the first server, a first address in response to a first search request from the first server when the processing apparatus has not received a second search request for a second address from the second server, return, to the first server, the second address in response to the first search request from the first server when the processing apparatus has received a second search request for the second address from the second server, and on the basis of the number of first and second search requests and the number of responses returned in the form of the second address in response to the first search request in a first period and the number of first search requests in a second period, calculate the number of responses to be returned in the form of the second address in response to the first search request in a third period, wherein the returning of the second address returns the second address in response to the first search request in the third period for the calculated number of responses.

\* \* \* \* \*